United States Patent [19]

La Branche et al.

[11] 3,986,810

[45] Oct. 19, 1976

[54] METHOD AND APPARATUS FOR SHAPING A NORMALLY RIGID PLASTIC PIPE

[75] Inventors: Harvey W. La Branche, Olympia; John C. Dimmer, Tacoma, both of Wash.

[73] Assignee: Western Plastics Corporation, Tacoma, Wash.

[22] Filed: Jan. 31, 1975

[21] Appl. No.: 546,080

Related U.S. Application Data

[62] Division of Ser. No. 363,081, May 23, 1973, Pat. No. 3,923,952.

[52] U.S. Cl. ............................. 425/393; 264/296; 264/213; 425/403; 425/DIG. 218
[51] Int. Cl.² ......................................... B29C 1/12
[58] Field of Search ............ 425/DIG. 14, DIG. 58, 425/DIG. 211, DIG. 218, 438, 384, 392, 393, 403; 264/313, 296

[56] References Cited
UNITED STATES PATENTS 3,432,887  3/1969  Poux et al. .......................... 425/393
3,823,216  7/1974  Petzetakis .......................... 425/393

FOREIGN PATENTS OR APPLICATIONS 2,061,899  12/1970  Germany ............................ 425/393

Primary Examiner—Francis S. Husar
Assistant Examiner—Robert J. Charvat
Attorney, Agent, or Firm—Eugene D. Farley

[57]  ABSTRACT

A normally rigid plastic pipe is shaped by softening a selected zone of the pipe, inserting into the softened zone a resiliently deformable mandrel and pressing axially on opposite sides of the mandrel. This expands the mandrel radially into frictional engagement with the softened pipe zone. Contemporaneously the mandrel is shortened axially, thereby correspondingly expanding radially and shortening axially the softened portion of the pipe while proportionately thickening its side walls.

6 Claims, 3 Drawing Figures

METHOD AND APPARATUS FOR SHAPING A NORMALLY RIGID PLASTIC PIPE

This is a division of application Ser. No. 363,081, filed May 23, 1973, now U.S. Pat. No. 3,923,952.

This invention relates to a method and apparatus for shaping a normally rigid plastic pipe or tube. It pertains particularly to a method of forming a bell or socket on the end of a synthetic thermoplastic pipe such as is employed in the transmission of fluids, as an electrical conduit and the like.

Pipes made of heat softenable synthetic plastics are well known and widely used for many purposes. They customarily are supplied in standard lengths and diameters. To enable joining successive lengths end to end it is conventional practice to heat-soften one end of each length and then form it with a mandrel to an enlarged diameter. This forms an integral bell or socket dimensioned to receive the unaltered end of an adjacent pipe length in telescoping relationship. The telescoped ends then are sealed with cement or by means of O-rings to form the finished joint.

Where an integral bell is formed in the manner described, there obviously is a thinning of the wall in the formed zone resulting from stretching it to an increased diameter. This thinning is inconsequential where the pipe is to be used at ambient pressures, as is the case where it is used for electrical duct work, or as drain pipe.

However, if the pipe is intended for use in situations in which it is subjected to pressure, as in pressurized water systems, thinning of the pipe at the bell is unacceptable because the pipe strength is reduced correspondingly. In such situations it is required that the wall thickness of the bell be at least as great as the wall thickness of the balance of the pipe.

Various expedients heretofore have been employed to provide pipe having a bell of adequate wall thickness.

In one, a molded bell fitting of the desired wall thickness is lapped over the end of a length of pipe and cemented thereto. This provides the desired bell wall thickness and the exterior detailing of the bell is sharp and workmanlike. However, the cemented-on bell is less reliable than an integral bell because cementing the molded bell onto the pipe is difficult, particularly with the larger sizes and the workmanship involved in making the joint may be unreliable. Because of the added labor, the cost is more. Because of the necessity of providing a multiplicity of expensive injection molds, one for each bell size, the number of sizes commercially available is likely to be restricted to the most popular sizes only.

A second procedure for manufacturing plastic pipe with bells of adequate wall thickness is set forth in U.S. Pat. No. 3,264,383.

In accordance with this method, plastic pipe is extruded with spaced segments of increased wall thickness. The pipe is cut at the thick-walled areas which then form the pipe ends. These ends then are enlarged over a mandrel to the desired bell shape. The increased thickness of the original pipe end thus compensates for the thinning occurring when it is forced over a mandrel. This method obviously requires complex and expensive machinery to manufacture the extruded pipe with spaced segments of increased thickness.

Still another procedure for achieving the desired result is to cement an external collar of plastic over the ends of the pipe which are to be mandrel-belled. This procedure is workable, but requires careful control of collar dimensions and placement with resultant increased costs.

It accordingly is the object of the present invention to provide method and apparatus for shaping a normally rigid plastic pipe or tube, specifically the end of a thermoplastic pipe, which overcomes the foregoing problems and provides an integral bell having a wall thickness which is as great as or greater than the thickness of the balance of the pipe, without the necessity for manufacturing the pipe in the first instance with zones of increased thickness, and without the necessity of using an external thickening collar. The hereindescribed procedure has additional advantages in that it:

Provides for molding detail such as trademarks, instructions, etc. into the exterior of the bell.

Provides for a molded-in re-entrant pocket suitable for the reception of a sealing O-ring.

Compensates for manufacturing variations in wall thickness.

Requires only inexpensive equipment so that tooling costs are low.

Makes possible the provision of a wide range of pipe sizes at practical cost.

Makes possible molding chamfers in the bell margin.

Can be automated.

The manner in which the foregoing and other objects of this invention are accomplished will be apparent from the accompanying specification and claims considered together with the drawings wherein:

In its broad aspect, the hereindescribed method of shaping a normally rigid plastic pipe or tube comprises first softening a selected zone of the pipe, usually its end. A resiliently deformable mandrel is inserted into the softened zone. The mandrel is compressed axially and simultaneously on its opposite sides by an amount predetermined to expand it radially into frictional engagement with the softened pipe zone.

While the mandrel is in such engagement, it is shortened by compressing it axially. This correspondingly expands the softened pipe radially and shortens it axially. Because of the resulting frictional drag, the side walls of the tube in the softened zone are thickened by an amount proportional to its shortening.

As additional features, there may be provided a rigid zone immediately adjacent the softened zone of the pipe and the mandrel may be dimensioned to engage both zones. Upon expansion of the mandrel, it releasably locks itself to the rigid zone of the pipe. This creates a positive drive in the direction of shortening the softened zone and thickening its walls.

Also, an abutment may be provided against which the end face of the softened pipe zone bears as it is shortened. This further increases the positive action of shortening the softened zone and thickening its walls.

Still further, the softened zone of the pipe may be enclosed in a die placed in forming relation to it so that as it is expanded it is shaped to a desired contour, for tended radially and shortened axially until it conforms to the inner contour of the die.

This effect is augmented by reason of the fact that piston rod segment 44 penetrates into the cool rigid zone of the tube, i.e. that to the left of reference line 32. Expansion of the mandrel in this zone positively but releasably locks the mandrel to the inner wall of the rigid portion of the tube and creates a positive drive.

The thickening effect is augmented further by abutment of the inner face of the tube against abutment surface 76.

Figure 1:
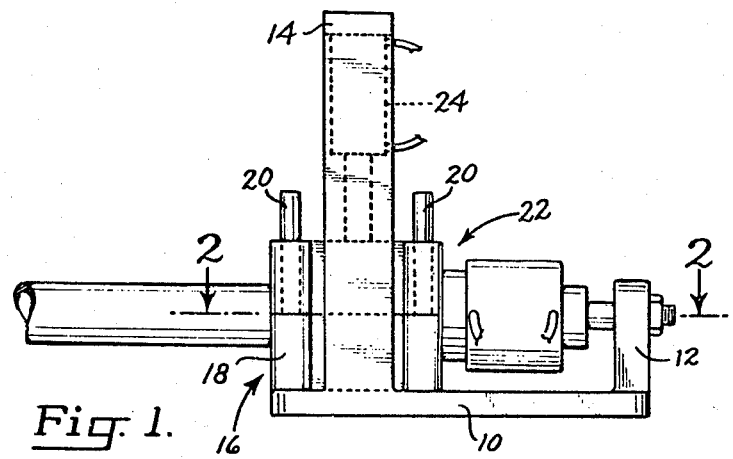
FIG. 1 is a view in side elevation of apparatus suitable for use in accomplishing the hereindescribed method of shaping plastic pipe or tube.
Figure 2:
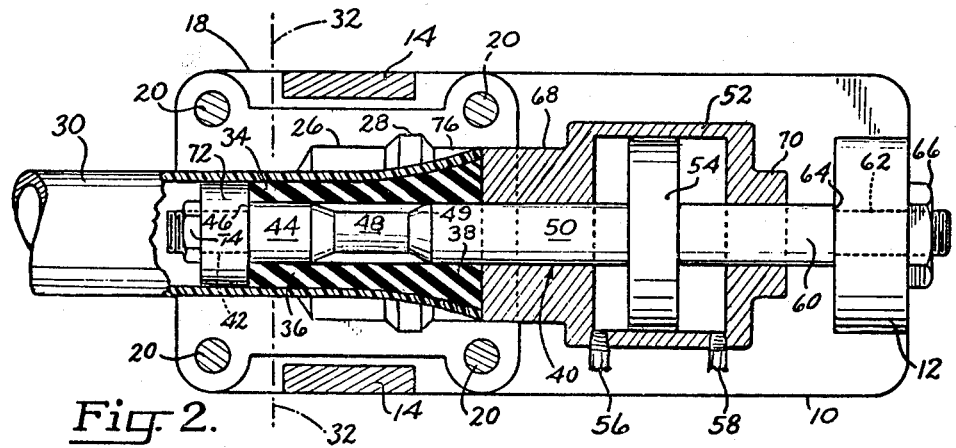
FIGS. 2 and 3 are longitudinal, sectional views taken along line 2—2 of FIG. 1, FIG. 2 illustrating the position of the apparatus at the start of the shaping operation and FIG. 3 illustrating the position of the apparatus at the conclusion thereof.
Figure 3:
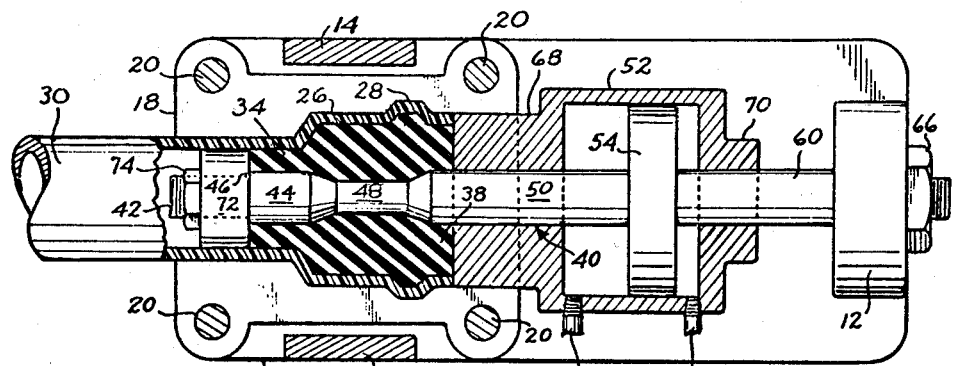

The softened portion of the pipe thus is locked at both upstream and downstream ends and is forced into a die cavity of known and predetermined capacity. The result is that a bell or socket is formed on the end of the pipe. After cooling of the bell to a rigidifying temperature, the piston is returned to its FIG. 2 position. This relaxes the mandrel. The die then is opened and the pipe removed.

The resulting bell is of precise dimensions and reproducible from pipe length to pipe length even though there may be some irregularity in wall thickness of the pipe as originally extruded. The following considerations prevail:

The initial forming conditions provide a mandrel volume $V_1$, and a remaining cavity volume $V_2$. When the plastic pipe with volume $V_3$ is introduced into the cavity, the remaining unfilled volume will be $(V_2 - V_3)$.

The distance that the cylinder 52 will move during the forming process is defined by the ratio of initial mandrel and plastic pipe volume to the total volume of mandrel, plastic pipe, and cavity. It will move until the cavity space is completely filled.

Thus if the plastic pipe is thin, then plastic pipe volume $V_3$ is reduced, and the remaining cavity volume $(V_2 - V_3)$ is increased. Cylinder 52 must move farther to fill the cavity. This farther movement will result in greater relative thickening of the pipe wall. Conversely, if the pipe is thick, then cylinder 52 does not move as far, so that relative thickening of the pipe is less.

The system thus compensates for variations in wall thickness to a degree dictated by the dimensions of the bell pocket, and the diameter of shaft 40.

Further, because of the shortening of the pipe through the frictional drag effect, the wall thickness of the bell portion of the product may assume any desired value, normally at least the thickness of the balance of the pipe.

Still further, thicker sections of pipe wall can be produced in selected pipe zones by the simple expedient of providing corresponding relieved segments 48 in shaft 40. This is apparent from the following considerations:

As cylinder 52 moves forward, cavity 26 will fill. The amount of motion of cylinder 52 required to fill the cavity will define the wall thickness of the pipe at this point in time. If shaft 40 is selectively reduced in diameter, as at 48, then further motion of cylinder 52 will be required to fill the cavity. The mandrel and plastic pipe in the same axial zone will be shortened further, but the mandrel and plastic pipe in the unrelieved zones at 44, 50 will not shorten. Thus a selectively thicker section of pipe wall can be produced, in zones defined by relieved areas 48.

Accordingly, by the practice of the invention, it is possible in a single operation to provide on the end of a plastic pipe an integral bell or socket having a wall of any desired thickness and an annular groove dimensioned to receive a sealing member such as an O-ring. Of particular significance is the fact that the thickened wall can be created in any selected zone or area of the pipe.

This result is achieved, furthermore, without the necessity of using costly injection molds for the separate manufacture of bells of various sizes, without the necessity of forming the pipe originally with thickened sections at spaced intervals, without the necessity of adding reinforcing rings to the bell area, and without delay of production schedules.

We claim:

1. Apparatus for shaping a normally rigid plastic tube having a softened zone, comprising:
    a. a resiliently deformable mandrel dimensioned for insertion into the softened zone and adjacent rigid portion of a tube to be shaped,
    b. mandrel pressing means engaging opposite ends of said mandrel for alternately pressing on the opposite ends of the mandrel for simultaneously expanding it radially and shortening it axially, and thereafter relaxing it to permit it to return to its original dimension, and
    c. die means surrounding the mandrel and positioned for contact by a rigid portion of a tube to be shaped adjacent the softened zone thereof and for forming contact by the softened zone of the tube during compression of the mandrel.

2. The apparatus of claim 1 wherein the mandrel pressing means includes movable abutment means arranged for abutting the adjacent end face of a tube to be shaped.

3. The apparatus of claim 1 wherein
    a. the mandrel comprises a hollow cylinder made of a resiliently deformable material and dimensioned for insertion inside a plastic tube to be shaped, and
    b. the mandrel pressing means comprises
        1. a piston rod extending within the die means and fixed at its outer end relative to the die means and mounting the mandrel adjacent its inner end,
        2. a first abutment rigidly mounted on the inner end of the piston rod and arranged for bearing engagement with the adjacent end of the mandrel,
        3. a second abutment freely slidable on the piston rod and extending into the die for engagement with both the inner end of the mandrel and the adjacent face of the end of a tube to be shaped,
        4. a fluid pressure cylinder integral with and extending outwardly from the second abutment means and freely encircling the piston rod, and
        5. a piston fixed to the piston rod within the cylinder, whereby the application of fluid pressure selectively to opposite ends of the cylinder effects selective extension and retraction of the second abutment relative to the die means and said alternate pressing and relaxing of the mandrel.

4. Apparatus for shaping a normally rigid plastic tube having a softened end zone, the apparatus comprising
    a. a mandrel comprising a hollow cylinder made of a resiliently deformable rubber and dimensioned for insertion inside the softened end zone and adjacent rigid portions of a plastic tube to be shaped,
    b. a piston rod having inner and outer ends and mounting the mandrel adjacent said inner end, c. die means freely surrounding the mandrel and arranged to surround the softened end zone and an adjacent rigid portion of a tube to be shaped, d. a first abutment rigidly mounted on the inner end of a piston rod and arranged for bearing engagement with the adjacent end of the mandrel, e. a second abutment freely slidable on the piston rod and extending into the die means for bearing engagement with both the adjacent end of the mandrel and the face of the softened end of a tube to be shaped, f. a fluid pressure cylinder integral with and extending outwardly from the second abutment and freely encircling the piston rod intermediate the ends of the latter, and g. a piston fixed to the piston rod within the cylinder, whereby the application of fluid pressure to one end of the cylinder effects movement of the cylinder along the piston rod and extension of the second abutment into the die means, thereby compressing the mandrel between the first and second abutments and expanding the mandrel radially while simultaneously shortening it axially, contemporaneously securing the plastic tube and mandrel within the die means against axial displacement and expanding the softened end zone of the plastic tube radially outward into forming contact with the die means, and the application of fluid pressure to the opposite end of the cylinder effects retraction of the cylinder and second abutment outwardly relative to the die means to return the mandrel to its original relaxed condition.

5. The apparatus of claim 4 wherein the piston rod comprises a segmented shaft having in a predetermined location opposite a selected area of the die means a relieved segment of reduced diameter which in the uncompressed condition of the mandrel is spaced therefrom, thereby forming a cavity positioned for receiving a portion of the mandrel upon compression of the latter.

6. Apparatus for shaping a normally rigid plastic tube having a softened zone, comprising:

a. a resiliently deformable mandrel dimensioned for insertion into the softened zone and adjacent rigid portion of a tube to be shaped, the inner end of the mandrel being flared outwardly, b. mandrel pressing means engaging opposite ends of said mandrel for alternately pressing on the opposite ends of the mandrel for simultaneously expanding it radially and shortening it axially, and thereafter relaxing it to permit it to return to its original dimension, the mandrel pressing means including movable abutment means arranged for abutting the end face of the softened end zone of a tube to be shaped, and c. die means surrounding the mandrel and positioned for contact by a rigid portion of a tube to be shaped adjacent the softened zone thereof and for forming contact by the softened zone of the tube during compression of the mandrel.

* * * * *